UNITED STATES PATENT OFFICE.

JOHANNES SMIT, OF LEEUWARDEN, NETHERLANDS.

COMPOUND FOR PREVENTING BOILER INCRUSTATIONS.

SPECIFICATION forming part of Letters Patent No. 662,205, dated November 20, 1900.

Application filed January 22, 1900. Serial No. 2,391. (No specimens.)

*To all whom it may concern:*

Be it known that I, JOHANNES SMIT, machinist, a subject of the Queen of the Netherlands, residing at 501 Noordirliet R, Leeuwarden, Netherlands, have invented certain new and useful Improvements in Means for the Prevention of Incrustation in Steam-Boilers, of which the following is a full, clear, and exact description.

Many remedies have already been proposed and applied for the purpose of preventing the formation of incrustation in steam-boilers. The process most commonly used for this purpose and one which is known to be the most effective in its action consists in precipitating the salts dissolved in the water before the water enters the steam-boiler by the addition of suitable chemical agents. For instance, soda is added to water containing gypsum, whereby insoluble carbonate of lime is eliminated, while the sulfate of sodium which remains in the water in solution does not produce any incrustation owing to its being soluble in water. Water containing gypsum is purified in a similar manner by the addition of a solution of chlorid of barium, the insoluble sulfate of barium being precipitated, while the easily-soluble chlorate of lime does not cause any formation of incrustation owing to its solubility. Water which contains bicarbonate of calcium is heated, thus causing the carbonate acid gas to escape and the neutral carbonate of lime to be precipitated. These methods of purifying the boiler feed-water are tedious and expensive, the more so as the purification of the water in this manner always remains an incomplete one. In the following a means is described which renders it possible to prevent the formation of incrustation in steam-boilers in a simple manner without the feed-water having to be subjected to any special treatment before entering the boiler. The interior of the boiler before being filled with water is coated with a mixture made of the following materials and in the manner indicated: One liter train-oil, one kilo horse-fat, and one kilo consistent or solid fat are melted, and into this mixture are stirred four kilos powdered black-lead, one kilo white zinc, one kilo lampblack, one liter liquid creosote, and 1.5 liters rain water. The mixture so obtained is allowed to cool while being stirred continually, so that it thickens into a uniform and thoroughly well-mixed paste. This mixture possesses the property of adhering firmly to the sides of the boilers and of not being detached from the sides of the boilers by hot water nor by superheated steam. The salts dissolved in the boiler water cannot attach themselves to the sides of the boilers, owing to there being no direct contact between the water and the hot sides of the boiler. They are secreted in thin lamels on the thin layer of grease, and finding only a slight support on the layer of grease they crumble away from same and fall either onto the bottom of the boiler or else they float about freely in the circulating boiler water. As soon as the elimination of the "incrustation" in this form of thin lamels has reached a certain limit the incrustation may be removed in a simple manner after opening the steam-boiler and no damage is caused to the boiler and a saving of fuel is effected.

The proportions of the quantities of the substances which are used for the above preventive of incrustation of steam-boilers may be varied, and the proportions stated are to be considered merely as one form of effecting this object.

What I claim, and desire to secure by Letters Patent, is—

A composition of matter for coating the inside of steam-boilers for the prevention of the formation of incrustations, consisting in a mixture of a consistent fat, train-oil and horse-fat, with water, liquid creosote, black-lead, zinc-white, and lampblack, substantially as described.

In witness whereof I subscribe my signature in presence of two witnesses.

JOHANNES SMIT.

Witnesses:
GERIT ZANTINGE,
AUGUST SIEGFRIED DOCER.